United States Patent [19]

Weed

[11] 4,373,922
[45] Feb. 15, 1983

[54] OUTBOARD PROPULSION GEARCASE

[75] Inventor: Lyle E. Weed, Van Dyne, Wis.

[73] Assignee: Brunswick Corporation, Skokie, Ill.

[21] Appl. No.: 142,578

[22] Filed: Apr. 21, 1980

[51] Int. Cl.³ .............................................. B63H 1/20
[52] U.S. Cl. ........................................................ 440/89
[58] Field of Search ..................... 440/89, 900, 88, 49, 440/82, 78; 277/133, 134, 96.1; 308/92, 240, 239

[56] References Cited

U.S. PATENT DOCUMENTS

| | | | |
|---|---|---|---|
| 3,092,185 | 6/1963 | Alexander | 440/89 |
| 3,434,447 | 3/1969 | Christensen | 440/89 |
| 3,667,818 | 6/1972 | Adamski et al. | 308/92 |
| 3,705,753 | 12/1972 | Bierlein et al. | 308/240 |
| 3,871,324 | 3/1975 | Snyder | 440/89 |
| 3,973,781 | 8/1976 | Grörich | 277/134 |

Primary Examiner—Trygve M. Blix
Assistant Examiner—Stephen P. Avila
Attorney, Agent, or Firm—O. T. Sessions

[57] ABSTRACT

An outboard drive unit for a watercraft having a through-the-propeller hub exhaust system for engine exhaust has a bearing support member (22) which carries the propeller shaft (18) and separates the exhaust passages from the propeller shaft gears (24) and (25). Lubricant retaining surfaces (4B) are formed on the bearing support member (22) to prevent corrosion between the support member (22) and housing (11).

8 Claims, 2 Drawing Figures

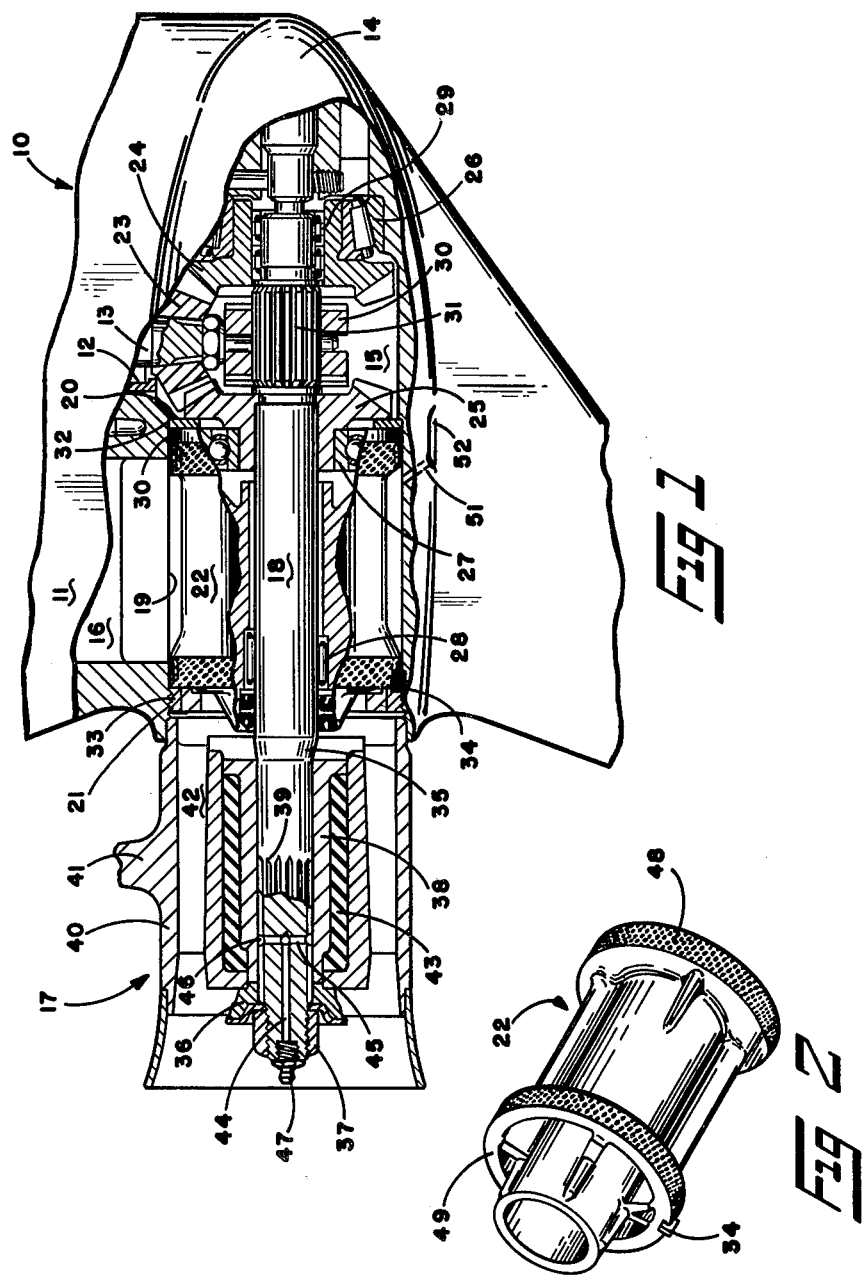

OUTBOARD PROPULSION GEARCASE

DESCRIPTION

Technical Field

This invention relates to outboard propulsion units for outboard motors or stern drives and particularly to such units having an engine exhaust system directing exhaust gases through the propeller.

Background Art

A variety of outboard propulsion units have been constructed to discharge engine exhaust gases through the propeller. U.S. Pat. No. 3,092,185 is representative of these devices. The submersible portions of the exhaust system are exposed alternately to hot engine exhaust gases and fresh or salt water for all of the engine's operating life and, often much of its storage life. As a result, corrosion is a frequent problem.

Disclosure of Invention

An engine drive outboard drive unit has a housing with a downwardly extending exhaust passage. A generally cylindrical horizontal bore in the housing receives exhaust gases from the exhaust passage and discharges them through a propeller. The propeller is mounted on a shaft which, in turn, is supported in the horizontal bore by a bearing support member. The bearing support member also serves to direct the exhaust gases rearward and out to the propeller. The surfaces of bearing support member or the bore which engage each other are roughened to retain lubricant between the engaging surfaces. The roughened surface substantially eases removal of the bearing support after long periods of exposure to salt water and hot exhaust gases.

A drain hole may be provided in the bottom of the bore to prevent water from being trapped in the bore during storage of the unit.

BRIEF DESCRIPTION OF DRAWINGS

FIG. 1 is a partial sectional view of an outboard propulsion unit according to the invention.

FIG. 2 is a perspective view of the propeller shaft bearing support member.

BEST MODE FOR CARRYING OUT THE INVENTION

The gearcase 10 of an outboard propulsion unit shown in FIG. 1 includes a housing 11 having a vertical drive shaft bore 12 and a drive shaft 13 mounted for rotation therein. The housing 11 has a torpedo 14 surrounding a horizontal chamber 15 into which the drive shaft 13 extends. An exhaust passage 16 communicates with the chamber 15 to the rear of the drive shaft 13. An engine, not shown, drives a propeller 17 through the drive shaft 13 and a propeller shaft 18, and exhausts into the exhaust passage 16.

To the rear of the drive shaft 13 the chamber 15 includes a cylindrical bore 19 terminating at a shoulder 20 and has a threaded opening 21 at the rear of the housing 11. The bore 19 coaxially secures a spool-like bearing support member 22 through which the propeller shaft 18 extends. The support member 22 serves to support the propeller shaft 18 and to guide the engine's exhaust flow from the vertical exhaust passage 16 to the generally horizontal propeller hub.

A bevel gear 23 is fixed to the drive shaft 13 and meshes with forward and reverse gears 24 and 25 supported by a roller thrust bearing 26 mounted in the housing 11 and a ball bearing 27 mounted in the support member 22. The propeller shaft 18 is rotatably supported by needle bearings 28 and 29 mounted in the support member 22 and forward gear 24, respectively. A sliding clutch 30 is mounted on splines 31 on the propeller shaft 18 and can be axially moved to engage either the forward or reverse gear to drive the propeller shaft 18. The bearing support member 22 is forced against a thrust ring 32 which engages the shoulder 20 by means of an annular threaded collar 33 which is screwed into the threaded opening 21 at the rear of the housing 11. A key 34 prevents rotation of the support member 22.

The propeller shaft 18 carries a propeller 17 which is secured longitudinally on the shaft 18 between the shoulder 35 and thrust hub 36 by a lock nut 37. The propeller hub includes an inner sleeve 38 mounted on splines 39 to rotate with the shaft 18 and an outer sleeve 40 which carries the blades 41. The outer sleeve 40 is fixed to the inner sleeve 38 by fins 42 and an elastomeric member 43. A lubricant passage 44 is provided in the end of the propeller shaft 18 and a cross bore 45 communicates with the lubricant passage 44 and a groove 46 cut through the splines 39 around the circumference of the shaft 18 to permit lubrication of the mating splines 39 after installation of the propeller 17. A conventional grease fitting 47 is threadedly connected to the propeller shaft 18 for ease of lubrication.

The bearing support member 22 has a flange 48 at its forward end and a collar 49 at its aft end, generally corresponding to the diameter of the bore 19 to properly seat and align the support member 22. The support member 22 is fully closed forwardly and the flange 48 is stepped forwardly to accommodate an O-ring seal 50 between the support member 22, the thrust ring 32, and the wall of the bore to preclude passage of exhaust gases and moisture into the forward portion of the chamber 15 which houses the gears.

The aft end of the flange 48 is beveled at the bottom and a drain hole 51 through the housing 11 is provided. The drain hole 51 assures that water is not trapped in the horizontal bore 19 when the drive unit is tipped upward, as is normally the case when the unit is not in use. A groove 52 is provided ahead of the drain hole 51 on the outside of the housing to prevent turbulence around the hole when the drive unit is operating.

The surfaces of the flange 48 and collar 49 on the bearing support 22 which contact the bore 19 are knurled to retain a sealing lubricant when the support 22 is inserted in the bore 19. In the preferred embodiment the knurling is formed of a first series of parallel ridges on the surface at an angle to a second series of parallel ridges to form an array of lubricant retaining depressions to form closed pockets of approximately 0.015 inch depth. This arrangement prevents corrosion bonding of the aluminum housing 11 and support member 22 during extended exposures to water and engine exhaust gas.

What is claimed is:

1. An engine driven outboard drive unit for attachment to a watercraft, comprising:
   (A) a housing having a downwardly extending exhaust passage and a generally cylindrical horizontal bore which opens aft of said housing and receives exhaust gases from said passage;

(B) a propeller shaft mounted for rotation in said bore;
(C) a propeller mounted on said shaft at the aft end of said bore; and
(D) a bearing support member mounted in fixed relationship to said bore to support said shaft and to direct the exhaust gases rearwardly from said bore, said bearing support member and said bore having surfaces engaging each other to radially position said member in said bore, said engaging surface of said bearing support member having an array of depressions formed by a plurality of intersecting ridges and acting with said engaging surface of said bore to form closed pockets to retain lubricant between the engaging surfaces.

2. The drive unit defined in claim 1 wherein said bearing support member comprises a seal to keep water and exhaust gases out of the forward end of said bore.

3. The drive unit defined in claim 2 further comprising a hole through the bottom of said bore immediately aft of said seal to permit water to drain from said bore when the aft end of said bore is angled upwardly.

4. The drive unit defined in claim 3 wherein said hole is angled down and forward.

5. The drive unit defined in claim 4 further comprising a groove in the exterior ahead of said hole.

6. The drive unit defined in claim 1 wherein said propeller is fixed to said propeller shaft by mating splines.

7. The drive unit defined in claim 6 further comprising a means to apply lubricant to said splines without removing said propeller.

8. The drive unit defined in claim 7 wherein said lubricant applying means comprises a passage from the aft end of said propeller shaft to said splines.

* * * * *